United States Patent
Arora et al.

(10) Patent No.: US 6,961,769 B2
(45) Date of Patent: Nov. 1, 2005

(54) METHOD, APPARATUS, AND PROGRAM FOR MEASURING SERVER PERFORMANCE USING MULTIPLE CLIENTS

(75) Inventors: Rajiv Arora, Austin, TX (US); Jesse Mannes Gordon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/956,767

(22) Filed: Sep. 20, 2001

(65) Prior Publication Data

US 2003/0055956 A1 Mar. 20, 2003

(51) Int. Cl.[7] .......................................... G06F 15/173
(52) U.S. Cl. ................................ 709/224; 709/223
(58) Field of Search .................................. 709/224

(56) References Cited

U.S. PATENT DOCUMENTS

| | | | |
|---|---|---|---|
| 5,245,638 A | 9/1993 | Gustafson | 395/575 |
| 5,446,874 A | 8/1995 | Waclawsky et al. | 395/575 |
| 5,459,837 A * | 10/1995 | Caccavale | 709/226 |
| 5,790,425 A | 8/1998 | Wagle | 364/551 |
| 5,812,780 A | 9/1998 | Chen et al. | 395/200.54 |
| 5,819,066 A | 10/1998 | Bromberg et al. | 395/500 |
| 5,974,457 A | 10/1999 | Waclawsky et al. | 709/224 |
| 6,118,940 A | 9/2000 | Alexander, III et al. | 395/704 |
| 6,154,877 A | 11/2000 | Ramkumar et al. | 717/11 |
| 6,163,840 A | 12/2000 | Chrysos et al. | 712/227 |
| 6,360,332 B1 * | 3/2002 | Weinberg et al. | 714/4 |
| 6,449,739 B1 * | 9/2002 | Landan | 714/47 |
| 6,470,464 B2 * | 10/2002 | Bertram et al. | 714/37 |
| 6,477,483 B1 * | 11/2002 | Scarlat et al. | 702/186 |
| 6,735,719 B2 * | 5/2004 | Moe et al. | 714/38 |
| 6,738,933 B2 * | 5/2004 | Fraenkel et al. | 714/47 |
| 6,754,701 B1 * | 6/2004 | Kessner | 709/219 |
| 6,799,213 B1 * | 9/2004 | Zhao et al. | 709/224 |
| 2003/0046383 A1 * | 3/2003 | Lee et al. | 709/224 |

* cited by examiner

*Primary Examiner*—John B. Walsh
(74) *Attorney, Agent, or Firm*—Duke W. Yee; Marilyn Smith Dawkins; Francis Lammes

(57) ABSTRACT

Server performance is bench marked using multiple master processes. A local master process is created for each client computer system applying load on the server. Then a global master process is created on a physical computer system on which neither client nor server processes are running. The global master is responsible for the proper execution of the bench mark. The global master uses an inter-master communications protocol that enforces coordination among the disparate client systems and processes.

13 Claims, 4 Drawing Sheets

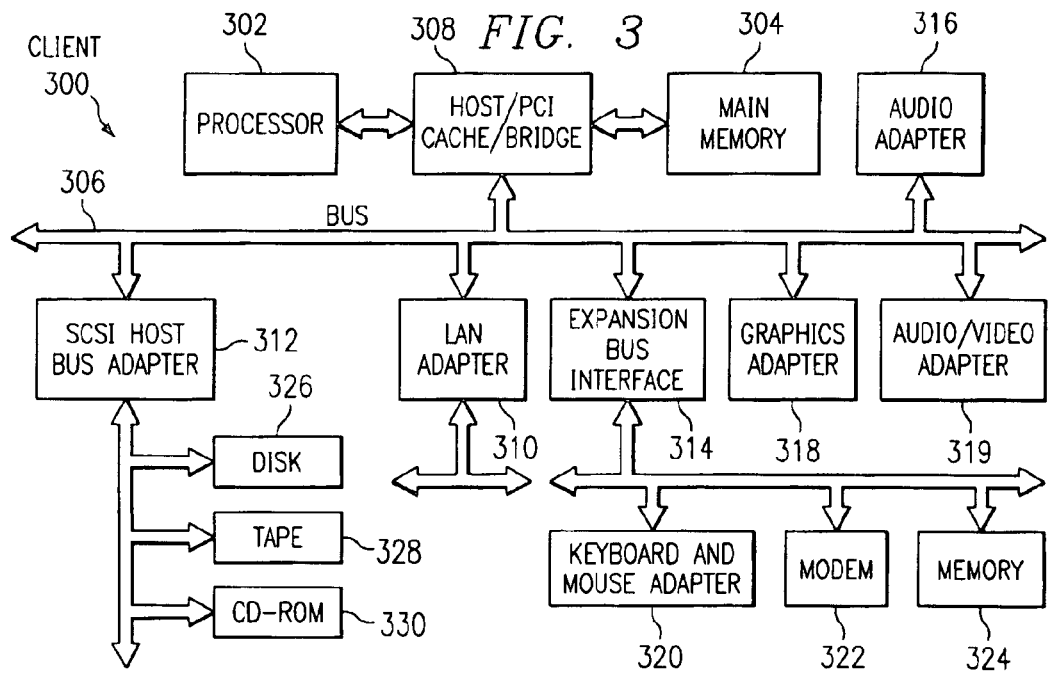
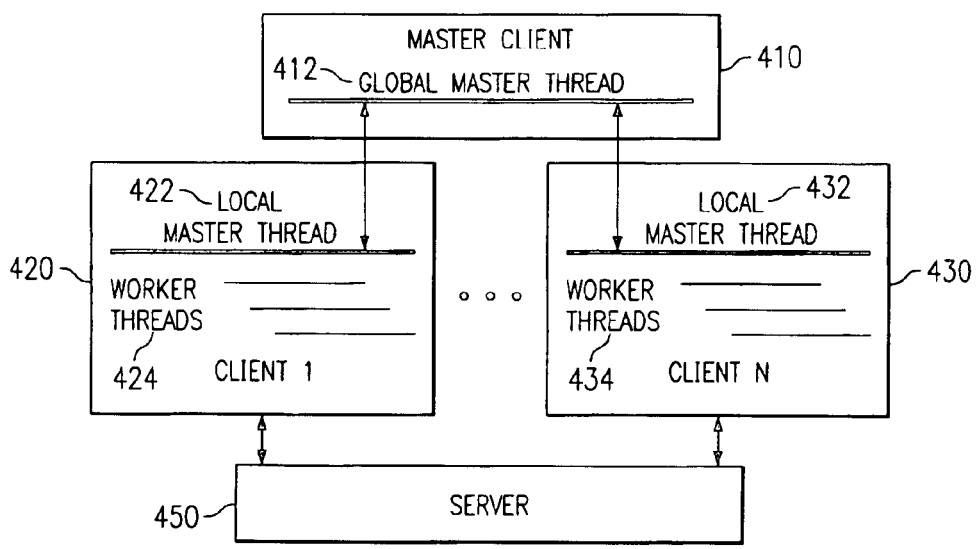

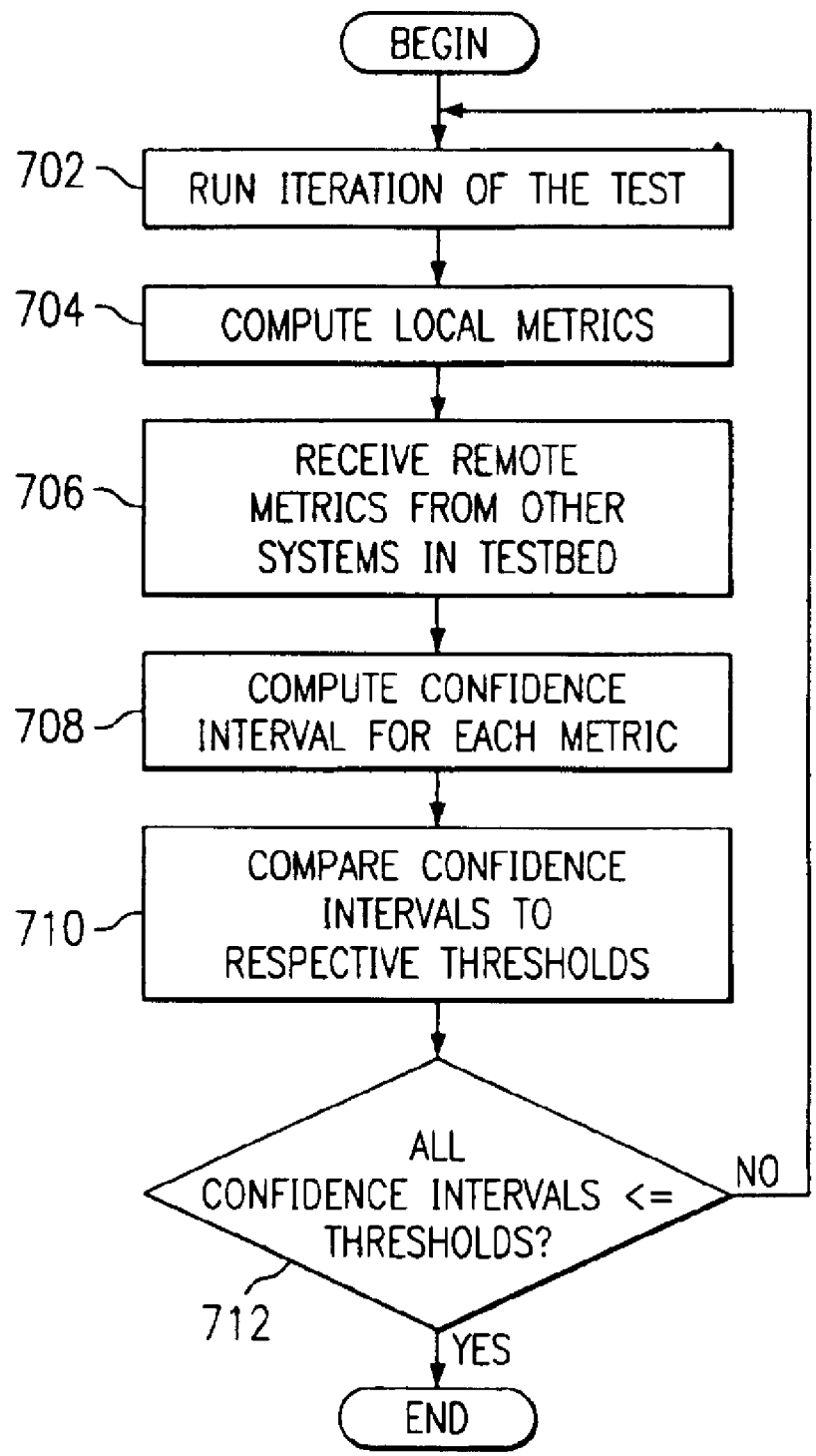

METHOD, APPARATUS, AND PROGRAM FOR MEASURING SERVER PERFORMANCE USING MULTIPLE CLIENTS

RELATED APPLICATIONS

The present application is related to commonly assigned and co-pending U.S. patent application Ser. No. 09/956,768 entitled "METHOD, APPARATUS, AND PROGRAM FOR ELIMINATING THREAD SKEW IN MULTITHREADED PERFORMANCE BENCH MARKS", filed on an even date herewith and hereby incorporated by reference.

BACKGROUND OF THE INVENTION

1. Technical Field

The present invention relates to data processing and, in particular, to performance benchmarks. Still more particularly, the present invention provides a method, apparatus, and program for measuring server performance using multiple clients.

2. Description of Related Art

A bench mark is a test that measures the performance of a system or subsystem on a well-defined task or set of tasks. Bench marks are commonly used to predict the performance of an unknown system on a known, or at least well-defined, task or workload. Bench marks can also be used as monitoring and diagnostic tools. By running a bench mark and comparing the results against a known configuration, one can potentially pinpoint the cause of poor performance. Similarly, a developer can run a bench mark after making a change that might impact performance to determine the extent of the impact.

Many performance bench marks for computer systems apply heavy loads to servers through the use of multiple, distributed client processes. To apply sufficient load, these client processes are typically distributed across multiple physical systems because an individual physical system is likely to become saturated. As a result, a master process is required to control the execution of the client processes. Current bench marks typically use a single master process running on one of the client systems.

Using a single master process leads to several problems. First, a single master process cannot ensure, nor know, when all the client processes are driving load on the server. Second, the master process may contend for system resources affecting the results reported by the client processes on the system on which it is running.

Therefore, it would be advantageous to provide an improved mechanism for measuring server performance using multiple clients.

SUMMARY OF THE INVENTION

The present invention bench marks server performance using multiple master processes. A local master process is created for each client computer system applying load on the server. Then a global master process is created on a physical computer system on which neither client nor server processes are running. The global master is responsible for the proper execution of the bench mark. The global master uses an inter-master communications protocol that enforces coordination among the disparate client systems and processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a block diagram illustrating a multiple master bench mark in accordance with a preferred embodiment of the present invention;

FIG. 7 is a flowchart illustrating a bench mark process with multiple metric convergence in accordance with a preferred embodiment of the present invention.

DETAILED DESCRIPTION OF THE PREFERRED EMBODIMENT

Figure 1:
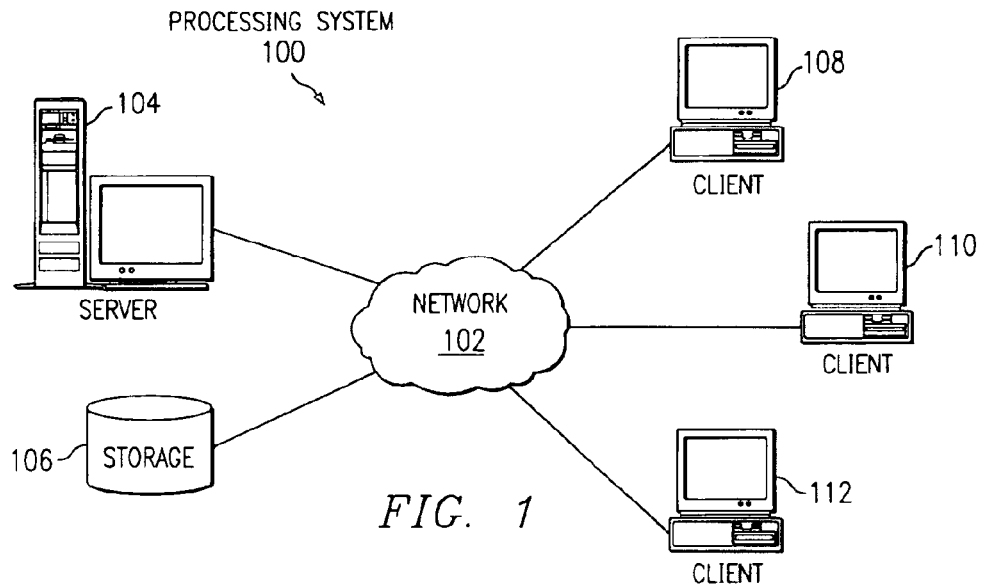
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In accordance with a preferred embodiment of the present invention, network data processing system 100 implements a performance bench mark by executing client processes that apply load onto server 104. For example, clients 108, 110 may execute local master (LM) processes that are controlled by a global master (GM) executing on client 112. Each local master process, or thread, may create worker threads that apply load to the server. Thus, the load-bearing processes may be distributed through the network, while still maintaining control of the load applied to the server. FIG. 1 shows three clients; however, fewer or more clients may be used to implement the performance bench mark of the present invention.

Figure 2:
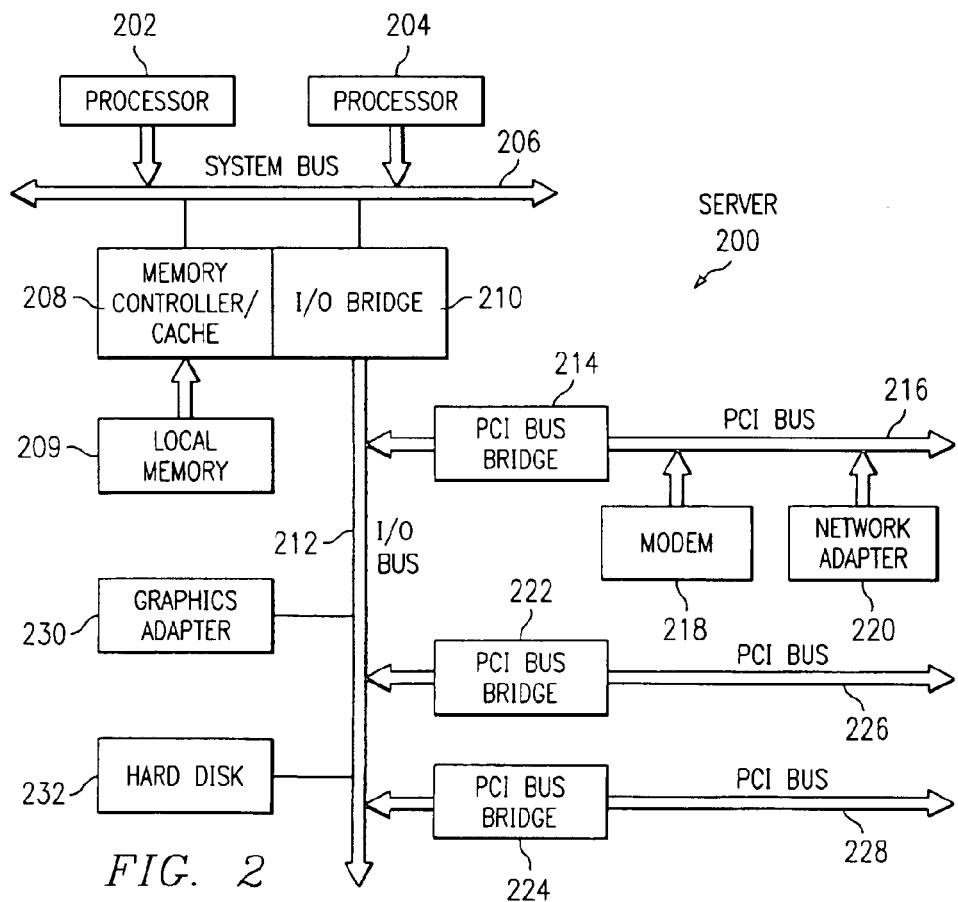
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference now to FIG. 4, a block diagram is shown illustrating a multiple master bench mark in accordance with a preferred embodiment of the present invention. Master client 410 runs global master thread 412, which is responsible for the proper execution of the bench mark. Global master 412 uses an inter-master communications protocol, which enforces coordination among the disparate client systems and processes.

A local master thread is created for each of clients 1-N 420–430. Client 1 420 runs local master thread 422 and client N 430 runs local master thread 432. Each local master thread creates worker threads that apply load on server 450. Server 450 may also be a server cluster or server farm that appears to the clients as a single server (i.e. has a single IP address).

As shown in FIG. 4, local master thread 422 creates worker threads 424 on client 420 and local master 432 creates worker threads 434 on client 430. The local master threads create worker threads and control the client processes in response to instructions from global master thread 412. The inter-master communications protocol is described below with respect to the flowcharts shown in FIGS. 5 and 6.

Figure 5:
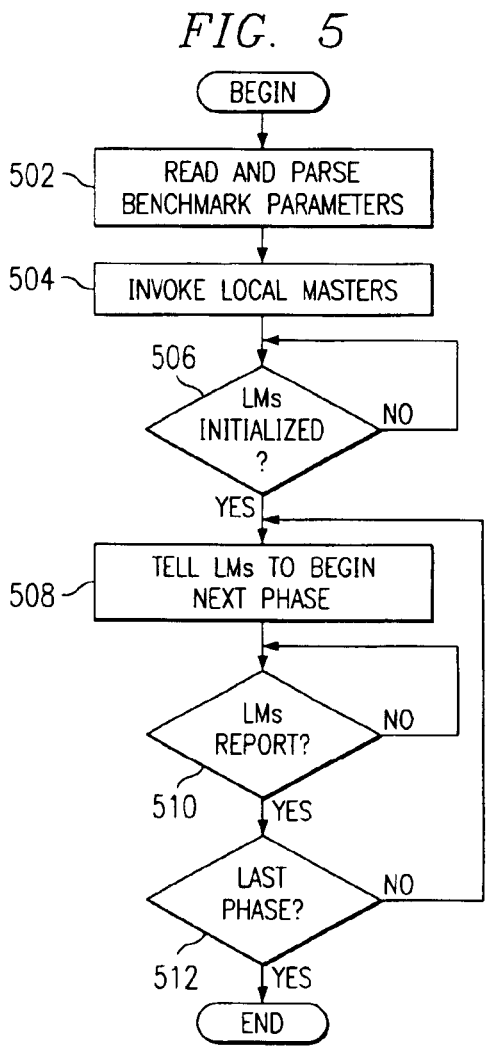
FIG. 5 is a flowchart illustrating a global master process in accordance with a preferred embodiment of the present invention.

Particularly, with reference to FIG. 5, a flowchart illustrating a global master process is shown in accordance with a preferred embodiment of the present invention. The process begins and the global master reads and parses the bench mark parameters (step 502). The global master process then invokes the local masters (step 504) and a determination is made as to whether the local masters have been initialized (step 506). If the local masters have not been initialized, the process returns to step 506 until the local masters have all reported that they have been initialized.

If the local masters have been initialized in step 506, the global master process tells the local masters to begin the next phase (step 508) and a determination is made as to whether the local masters have reported that they have concluded the phase (step 510). If the local masters have not reported that they have concluded the phase, the process returns to step 510 until the local masters have all reported that they have concluded the phase.

If the local masters have concluded the phase in step 510, a determination is made as to whether the phase is the last phase (step 512). If the phase is not the last phase, the process returns to step 508 to tell the local masters to begin the next phase. If the phase is the last phase in step 512, the global master process ends.

Figure 6:
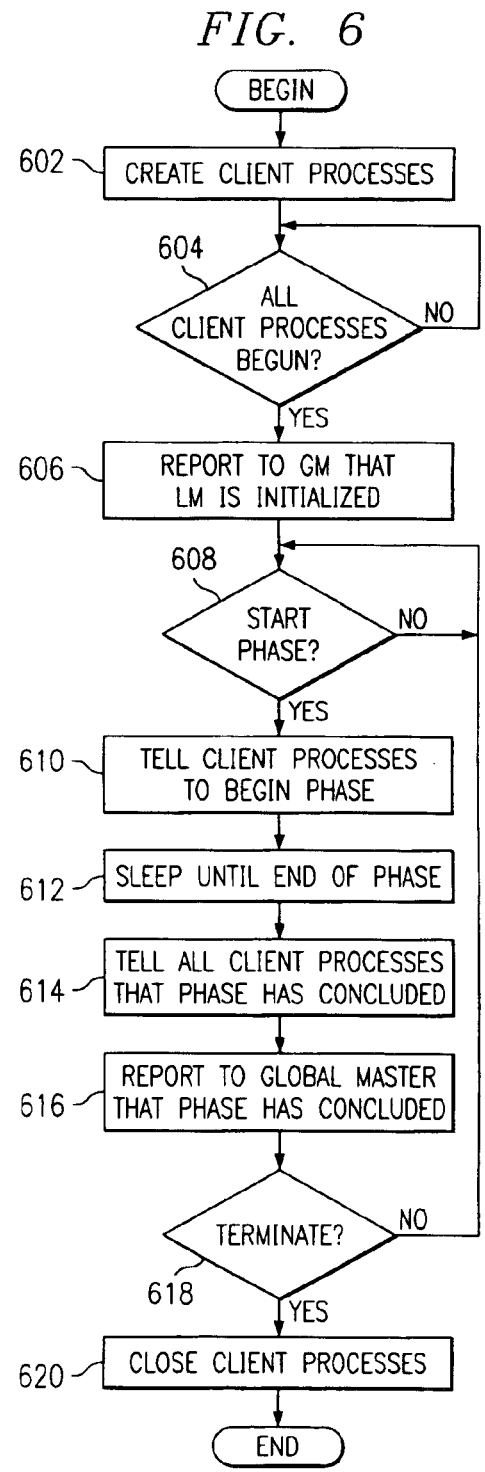
FIG. 6 is a flowchart illustrating a local master process in accordance with a preferred embodiment of the present invention.

Turning now to FIG. 6, a flowchart illustrating a local master process is shown in accordance with a preferred embodiment of the present invention. The process begins when the global master invokes the local master and the local master process creates the client processes (step 602). These processes are the worker threads that apply load on the server. Next, a determination is made as to whether all the client processes have begun execution (step 604). If the client process have not all begun execution, the process returns to step 604 until all the client processes are executing.

If the client processes have begun execution in step 604, the process reports to the global master that the local master is initialized (step 606). Thereafter, a determination is made as to whether an instruction is received from the global master to start a phase (step 608). If an instruction is not received from the global master to start a phase, the process returns to step 608 until the start of the next phase.

If an instruction is received to start a phase in step 608, the process tells the client processes to begin the phase (step 610) and sleeps until the end of the phase (step 612). When the phase has ended, the local master process tells all the client processes that the phase has concluded (step 614) and reports to the global master that the phase has concluded (step 616). If the phase is a results reporting phase, the local master process may report results in step 616. Next, a determination is made as to whether an instruction is received from the global master to terminate (step 618).

If an instruction is not received from the global master to terminate, the process returns to step 608 to wait for the start of the next phase. If an instruction is received from the global master to terminate in step 618, the local master process closes the client processes (step 620) and ends.

A common problem in performance bench marking of computer systems is the determination of whether the bench mark results have statistically converged. Typically, bench marks are run repeatedly and the resulting metrics are post processed to determine their confidence interval as a percentage of the mean. The confidence interval is a standard statistical computation given a specified confidence level, such as 90% or 95% confidence. The confidence interval is the smallest range under the normal distribution that will just enclose a probability equal to the confidence level, as known in the art. Metrics have converged if the confidence interval is below a specified threshold.

However, many bench marks yield multiple, equally important metrics. For example, a bench mark may measure the throughput and CPU utilization of a system. If statistical convergence testing is done on a single metric, the result may be misleading or invalid. In accordance with a preferred embodiment of the present invention, the bench mark code determines the statistical convergence of all the relevant metrics and has the bench mark converge only if all of the individual metrics have converged.

As an extension, this can also include metrics computed on remote systems. For example, the bench mark testbed shown in FIG. 4 consists of several systems. The bench mark may converge on metrics, such as CPU utilization, computed on clients 1-N. In this case, the master would query the remote systems for these metrics and incorporate them in the set of metrics to check for convergence.

With reference to FIG. 7, a flowchart illustrating a bench mark process with multiple metric convergence is shown in accordance with a preferred embodiment of the present invention. The process begins and runs an iteration of the test (step 702). Next, the process computes local metrics (step 704) and receives remote metrics from other systems in the testbed (step 706). Thereafter, the process computes a confidence interval for each metric (step 708) and compares the confidence intervals to their respective thresholds (step 710). Then, a determination is made as to whether all confidence intervals are less than or equal to their respective thresholds (step 712). If any confidence interval is greater than its respective threshold, the process returns to step 702 to run another iteration of the test. If all confidence intervals are less than or equal to their specified thresholds in step 712, the bench mark has converged and the process ends.

Thus, the present invention solves the disadvantages of the prior art by bench marking server performance using multiple master processes. A local master process is created for each client computer system applying load on the server. Then a global master process is created on a physical computer system on which neither client nor server processes are running. The global master is responsible for the proper execution of the bench mark. The global master uses an inter-master communications protocol that enforces coordination among the disparate client systems and processes.

The present invention allows for active and precise control of bench mark execution. The global master provides for centralized timing across all client physical systems and processes and removes control from measuring machines. The present invention also enables the synchronization of multiple load generators, each driving a single server. Furthermore, the synchronization by the global master process ensures that the measurement interval reflects the time when all load generating processes are driving the server, thereby ensuring accurate bench mark results.

Still further, the present invention is extensible. If one viewed the local master and the global master as communicating automata (finite state machines that communicate on state changes), then there is room for extensibility. With such a framework, extension are simple to implement. One such example of an extension may be, if one would want to monitor clients, then on a periodic basis, a query would go from the global master to a local master to ask for some current statistics. Then the local master would satisfy the query and return the answer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a global master process, for measuring server performance, comprising:
   invoking a plurality of local master processes, wherein each of the plurality of local master processes executes on a separate client in a network;
   instructing the plurality of local master processes to begin a bench mark phase;
   receiving results from the plurality of local master processes;
   (a) instructing the plurality of local master processes to run an iteration of a test;
   (b) receiving a plurality of metrics from each of the plurality of local master processes;
   (c) computing a confidence interval for the plurality of metrics for each of the plurality of local master processes;
   (d) determining whether each confidence interval is less than a respective threshold; and
   repeating steps (a) through (d) until all confidence intervals are less than their respective thresholds.

2. The method of claim 1, wherein the global master process executes on a first client.

3. The method of claim 2, wherein at least one of the local master processes executes on a second client.

4. The method of claim 1, wherein each of the local master processes applies load on a server.

5. An apparatus for measuring server performance in a global master process, comprising:
   invocation means for invoking a plurality of local master processes, wherein each of the plurality of local master processes executes on a separate client in a network;
   signal means for instructing the plurality of local master processes to begin a bench mark phase;
   receipt means for receiving results from the plurality of local master processes,
   (a) instructing means for instructing the plurality of local master processes to run an iteration of a test;
   (b) receiving means for receiving a plurality of metrics from each of the plurality of local master processes;
   (c) computing means for computing a confidence interval for the plurality of metrics for each of the plurality of local master processes;
   (d) determining means for determining whether each confidence interval is less than a respective threshold; and
   repeating means for repeating the means recited in (a) through (d) until all confidence intervals are less than their respective thresholds.

6. The apparatus of claim 5, wherein the global master process executes on a first client.

7. The apparatus of claim 6, wherein at least one of the local master processes executes on a second client.

8. The apparatus of claim 5, wherein each of the local master processes applies load on a server.

9. An apparatus for measuring server performance, comprising:
   a global master client, wherein the global master client executes a global master process;
   a plurality of bench mark clients, wherein the plurality of bench mark clients execute a plurality of local master processes; and
   a server, wherein the local master processes create worker processes that apply load on the server under control of the global master process, wherein the global master process executes a set of instructions to (a) instruct the plurality of local master processes to run an iteration of a test; (b) receive a plurality of metrics from each of the plurality of local master processes; (c) compute a confidence interval for the plurality of metrics for each of the plurality of local master processes; (d) determine whether each confidence interval is less than a respective threshold; and repeat instructions (a) through (d) until all confidence intervals are less than their respective thresholds.

10. A computer program product for measuring server performance in a global master process, comprising:
    instructions for invoking a plurality of local master processes, wherein each of the plurality of local master processes executes on a separate client in a network;
    instructions for instructing the plurality of local master processes to begin a bench mark phase;
    instructions for receiving results from the plurality of local master processes;
    (a) instructions for instructing the plurality of local master processes to run an iteration of a test;
    (b) instructions for receiving a plurality of metrics from each of the plurality of local master processes;
    (c) instructions for computing a confidence interval for the plurality of metrics for each of the plurality of local master processes;
    (d) instructions for determining whether each confidence interval is less than a respective threshold; and
    instructions for repeating instructions (a) through (d) until all confidence intervals are less than their respective thresholds.

11. The computer program product of claim 10, wherein the global master process executes on a first client.

12. The computer program product of claim 11, wherein at least one of the local master processes executes on a second client.

13. The computer program product of claim 10, wherein each of the local master processes applies load on a server.

* * * * *